US008989660B2

(12) United States Patent
Sabouri et al.

(10) Patent No.: US 8,989,660 B2
(45) Date of Patent: Mar. 24, 2015

(54) MULTIPLE HARDWARE INTERRUPT FUNCTIONALITY ON NEAR-FIELD COMMUNICATION (NFC)

(71) Applicant: QUALCOMM Incorporated, San Diego, CA (US)

(72) Inventors: Faramarz Sabouri, San Diego, CA (US); Haritha Eachempatti, San Diego, CA (US); Paul DenBoer, San diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 175 days.

(21) Appl. No.: 13/733,725

(22) Filed: Jan. 3, 2013

(65) Prior Publication Data

US 2014/0187154 A1 Jul. 3, 2014

(51) Int. Cl.
*H04B 5/00* (2006.01)
*H04W 52/02* (2009.01)

(52) U.S. Cl.
CPC ............ *H04B 5/00* (2013.01); *H04W 52/0245* (2013.01)
USPC ................ 455/41.1; 327/50; 326/16; 326/21; 340/10.1; 340/572.1

(58) Field of Classification Search
CPC ........ H04B 5/00; H04B 17/00; H04B 5/0075; H04B 5/0012
USPC ..................... 455/41.1, 41.2, 127.1
See application file for complete search history.

(56) References Cited

U.S. PATENT DOCUMENTS

| | | | | |
|---|---|---|---|---|
| 5,708,814 A | * | 1/1998 | Short et al. | 710/260 |
| 7,561,855 B2 | * | 7/2009 | Hofmeister et al. | 455/88 |
| 7,641,122 B2 | * | 1/2010 | Shin et al. | 235/492 |
| 7,945,289 B2 | * | 5/2011 | Sanders et al. | 455/557 |
| 8,416,063 B2 | * | 4/2013 | Jung et al. | 340/10.34 |
| 8,450,877 B2 | * | 5/2013 | Baarman et al. | 307/104 |
| 8,479,028 B2 | * | 7/2013 | Tsai et al. | 713/310 |
| 8,503,931 B2 | * | 8/2013 | Wilson | 455/41.1 |
| 8,566,495 B2 | * | 10/2013 | Venkatsuresh et al. | 710/266 |
| 8,670,710 B2 | * | 3/2014 | Miles | 455/41.1 |
| 8,687,331 B2 | * | 4/2014 | Lu et al. | 361/78 |
| 8,693,949 B2 | * | 4/2014 | Royston | 455/41.1 |
| 2008/0136594 A1 | | 6/2008 | Jung et al. | |
| 2010/0011128 A1 | | 1/2010 | Paycher et al. | |
| 2010/0171369 A1 | | 7/2010 | Baarman et al. | |

(Continued)

OTHER PUBLICATIONS

International Search Report and Written Opinion—PCT/US2013/068891—ISA/EPO—Mar. 12, 2014.

*Primary Examiner* — Marceau Milord
(74) *Attorney, Agent, or Firm* — Kevin T. Cheatham (57) ABSTRACT

Hardware interrupt functionality associated with a disable pin may be used to place a near-field communication (NFC) device into various operational modes. For example, various intermediate voltage windows may be defined within an I/O voltage domain and a resistive divider running off an I/O rail may generate multiple reference voltages within the I/O voltage domain. In one embodiment, different comparators may compare voltage on the disable pin to the reference voltages generated with the resistive divider to determine whether the voltage on the disable pin falls within one of the intermediate voltage windows. As such, if a particular comparator determines that the voltage on the disable pin falls within one of the intermediate voltage windows, a control signal may be generated to transition the NFC device into a corresponding operational mode.

23 Claims, 5 Drawing Sheets

(56) References Cited

U.S. PATENT DOCUMENTS

| | | |
|---|---|---|
| 2010/0197228 A1 | 8/2010 | Dong et al. |
| 2010/0277281 A1 | 11/2010 | Kang |
| 2011/0113164 A1 | 5/2011 | Venkatsuresh et al. |
| 2011/0157140 A1* | 6/2011 | Piasecki et al. ............... 345/212 |
| 2011/0261492 A1 | 10/2011 | Lu et al. |
| 2011/0306295 A1* | 12/2011 | Butler et al. ................. 455/41.1 |
| 2013/0127431 A1* | 5/2013 | Ansari ......................... 323/282 |
| 2014/0144985 A1* | 5/2014 | Dansachmueller et al. .. 235/382 |

\* cited by examiner

MULTIPLE HARDWARE INTERRUPT FUNCTIONALITY ON NEAR-FIELD COMMUNICATION (NFC)

FIELD OF DISCLOSURE

The present disclosure generally relates to near-field communication (NFC) devices, and in particular, to integrated circuits that can use a hardware interrupt to control functionality associated with NFC devices.

BACKGROUND

Near-field communication (NFC) generally refers to an open-platform, standard-based, short-range, high-frequency wireless communication technology that enables a bidirectional information exchange between NFC devices over small distances (e.g., about ten centimeters). NFC devices typically communicate via magnetic field induction. In particular, each NFC device may have an NFC loop antenna such that when the antennas of two NFC devices are within each other's near-field, the antennas effectively form an air-core transformer that operates in a globally available and unlicensed radio frequency band. The near-field generally encompasses an area around the antenna in which electromagnetic fields exist but may not propagate or radiate away from the antenna. Instead, the electromagnetic fields are typically confined to a volume approximately the same as the physical volume associated with the antenna. Various standards apply to NFC devices, including ISO/IEC 18902 (ECMA 340) and ISO/IEC 21481. In one operational scenario, a first NFC device may operate in an active mode and initiate communication with a second NFC device operating in a passive mode. The active NFC device drives the antenna associated therewith to generate a radio frequency (RF) field. As such, the second NFC device, which is known as the target device, need not use any internal power source. Rather, the second NFC device may capture energy from the RF field that the first NFC device created and use the captured energy to load modulate the antenna associated therewith to generate a reply. The first NFC device may then detect effects from the load modulation to receive information back from the second NFC device even though the second NFC device operates in the passive mode and does not use any internal power source.

Although NFC devices may consume relatively small amounts of power when operating in the manner described above, modern electronic devices are becoming smaller and power management has become a vital concern. For example, in order to maximize battery life in a portable device, even relatively small savings in power consumption can be important. To that end, one existing technique to reduce power consumption in NFC devices has been to use input/output (I/O) circuitry that generates a hardware interrupt to put a NFC module in a low current consumption mode, which may be referred to as a DISABLE mode (e.g., after a predetermined inactivity period, to prevent conflicts with other communication technologies that may coexist with the NFC module on a particular communication device, etc.). Furthermore, the NFC module may operate in a TEST mode or a SCAN mode during a design process, a manufacture process, or other processes that relate to diagnosing or otherwise testing the functionality associated with the NFC module. As such, different control signals may be used to set the NFC module to different target operating modes. However, having additional pinouts, I/O circuitry, or other components in a communication device in order to manage these control signals tends to increase system complexity and present issues with respect to size and cost. For example, physical area may be required to house the additional I/O circuitry and increased complexity due to additional pinouts, I/O circuitry, and/or other components may add to manufacturing costs and thereby increase the cost to consumers.

SUMMARY

The following presents a simplified summary of one or more embodiments of multiple hardware interrupt functionality that may be used in near-field communication (NFC) devices in order to provide a basic understanding thereof. As such, this summary should not be considered an extensive overview of all contemplated embodiments, nor is this summary intended to identify key or critical elements of all embodiments described herein or delineate the scope of any particular embodiment. Accordingly, the sole purpose of this summary is to present certain concepts relating to one or more embodiments relating to the multiple hardware interrupt functionality described herein in a simplified form as a prelude to the more detailed description presented below.

Exemplary embodiments are directed to using hardware interrupt functionality associated with a disable pin to place a near-field communication (NFC) device into various operational modes. For example, various intermediate voltage windows may be defined within an I/O voltage domain and a resistive divider running off an I/O rail may generate multiple reference voltages within the I/O voltage domain. In one embodiment, different comparators may compare voltage on the disable pin to the reference voltages generated with the resistive divider to determine whether the voltage on the disable pin falls within one of the intermediate voltage windows. As such, if a particular comparator determining that the voltage on the disable pin falls within one of the intermediate voltage windows, a control signal may be generated to transition the NFC device into a corresponding operational mode. For example, the control signal may be used to transition the NFC device into one or more of a DISABLE mode, a SCAN mode, or a TEST mode. Accordingly, using the hardware interrupt functionality associated with the disable pin to place the NFC device into different operational modes may reduce pin counts and enable self-sufficient testability, among other advantages. Furthermore, in one embodiment, outputs from one or more of the comparators may be delayed a predetermined amount of time to prevent accidentally triggering transitions to one or more of the operational modes (e.g., the SCAN mode or the TEST mode) during normal operations (i.e., when the voltage on the disable pin was intended to transition NFC components associated with the NFC device to the DISABLE mode).

According to one embodiment, a hardware interrupt method may comprise, among other things, detecting voltage on a disable pin, determining that the voltage detected on the disable pin falls within one of a plurality of operational windows, and configuring a communication module (e.g., a near-field communication module) to operate in one of a plurality of modes that is associated with the one of the plurality of operational windows. For example, in one embodiment, the plurality of modes may comprise a disabled mode associated with a first one of the plurality of operational windows, a scan mode associated with a second one of the plurality of operational windows, and a test mode associated with a third one of the plurality of operational windows. As such, configuring the communication module to operate in one of the plurality of modes may further comprise entering the disabled mode if the voltage on the disable pin falls within the first one of the plurality of operational windows, entering the scan mode if the voltage on the disable pin falls within the second one of the plurality of operational windows longer than a predetermined delay, and entering the test mode if the voltage on the disable pin falls within the third one of the plurality of operational windows longer than the predetermined delay.

According to one embodiment, the hardware interrupt method may further comprise generating a plurality of reference voltages with a resistive divider and comparing the voltage detected on the disable pin to the plurality of reference voltages generated with the resistive divider to determine whether the voltage on the disable pin falls within one of the plurality of operational windows. In one embodiment, the resistive divider may be operatively coupled to an input/output (I/O) rail, wherein circuitry to compare the voltage on the disable pin to the plurality of reference voltages may be enabled if a supply voltage associated with the I/O rail exceeds a predetermined threshold. In one embodiment, the circuitry may further run off the I/O rail and may only be enabled when the supply voltage on the I/O rail reaches a sufficiently high level that may allow output signals generated with the circuitry to have well-defined states. For example, in one embodiment, the plurality of reference voltages may define the plurality of operational windows within an I/O voltage domain, wherein the voltage on the disable pin may generally swing between 0V and a voltage in the I/O domain (e.g., 1.8V). As such, the plurality of reference voltages and the associated operational windows may be used to generate output signals that may trigger a transition to the TEST mode if the disable pin voltage falls between 0.45V and 0.9V for longer than a predetermined delay period, a transition to the SCAN mode if the disable pin voltage falls between 0.9V and 1.35V for longer than the predetermined delay period, and a transition to the DISABLE mode if the disable pin voltage falls between 1.35V and 1.8V.

According to one embodiment, an apparatus that uses a hardware interrupt associated with a disable pin to place the NFC device into various operational modes may comprise means for detecting voltage on a disable pin, means for determining that the voltage detected on the disable pin falls within one of a plurality of operational windows, and means for configuring a communication module to operate in one of a plurality of modes that is associated with the one of the plurality of operational windows. For example, in one embodiment, the plurality of modes may comprise a disabled mode associated with a first one of the plurality of operational windows, a scan mode associated with a second one of the plurality of operational windows, and a test mode associated with a third one of the plurality of operational windows. As such, the means for configuring the communication module to operate in one of the plurality of modes may further comprise means for entering the disabled mode if the voltage on the disable pin falls within the first one of the plurality of operational windows, means for entering the scan mode if the voltage on the disable pin falls within the second one of the plurality of operational windows longer than a predetermined delay, and means for entering the test mode if the voltage on the disable pin falls within the third one of the plurality of operational windows longer than the predetermined delay.

According to one embodiment, the apparatus may further comprise means for generating a plurality of reference voltages with a resistive divider and means for comparing the voltage detected on the disable pin to the plurality of reference voltages generated with the resistive divider to determine whether the voltage on the disable pin falls within one of the plurality of operational windows. In one embodiment, the resistive divider may be operatively coupled to an input/output (I/O) rail, wherein the apparatus may comprise means for enabling circuitry to compare the voltage on the disable pin to the plurality of reference voltages if a supply voltage associated with the I/O rail exceeds a predetermined threshold. In one embodiment, the circuitry may further run off the I/O rail and may only be enabled when the means for enabling determines that the supply voltage on the I/O rail reaches a sufficiently high level that may allow output signals generated with the circuitry to have well-defined states. For example, in one embodiment, the plurality of reference voltages may define the plurality of operational windows within an I/O voltage domain, wherein the voltage on the disable pin may generally swing between 0V and a voltage in the I/O domain (e.g., 1.8V). As such, the plurality of reference voltages and the associated operational windows may be used to generate output signals that may trigger a transition to the TEST mode if the disable pin voltage falls between 0.45V and 0.9V for longer than a predetermined delay period, a transition to the SCAN mode if the disable pin voltage falls between 0.9V and 1.35V for longer than the predetermined delay period, and a transition to the DISABLE mode if the disable pin voltage falls between 1.35V and 1.8V.

According to one embodiment, an apparatus that uses a hardware interrupt associated with a disable pin to place the NFC device into various operational modes may comprise at least one processor configured to detect voltage on a disable pin, determine that the voltage detected on the disable pin falls within one of a plurality of operational windows, and configure a communication module to operate in one of a plurality of modes that is associated with the one of the plurality of operational windows. Furthermore, in one embodiment, the apparatus may comprise a memory coupled to the at least one processor.

According to one embodiment, a computer-readable storage medium may comprise computer-executable instructions recorded thereon, wherein executing the computer-executable instructions on one or more processors may cause the processors to use a hardware interrupt associated with a disable pin to place the NFC device into various operational modes. For example, in one embodiment, the computer-executable instructions may cause the processors to detect voltage on a disable pin, determine that the voltage detected on the disable pin falls within one of a plurality of operational windows, and configure a communication module to operate in one of a plurality of modes that is associated with the one of the plurality of operational windows.

According to one embodiment, a circuit may be used to generate a control signal that can transition the NFC device into various operational modes based on hardware interrupt functionality associated with a disable pin. For example, in one embodiment, the circuit may comprise, among other things, a disable pin, a resistive divider configured to generate a plurality of reference voltages, and a comparator stage configured to compare voltage on the disable pin to the plurality of reference voltages and generate a control signal to indicate a target mode associated with a communication module if the voltage on the disable pin falls within one of a plurality of operational windows based on the plurality of reference voltages. In one embodiment, the resistive divider may be operatively coupled to an I/O rail and the circuit may further comprise a monitor stage configured to generate a signal that enables the comparator stage if a supply voltage associated with the I/O rail exceeds a predetermined threshold. In one embodiment, the circuit may further run off the I/O rail and may only be enabled when the supply voltage on the I/O rail reaches a sufficiently high level that may allow output signals generated with the circuit to have well-defined states.

According to one embodiment, the plurality of reference voltages generated with the resistive divider may define the plurality of operational windows within an I/O voltage domain, wherein the plurality of modes comprise a disabled mode associated with a first one of the plurality of operational windows, a scan mode associated with a second one of the plurality of operational windows, and a test mode associated with a third one of the plurality of operational windows. Furthermore, in one embodiment, the comparator stage associated with the circuit may comprise a first comparator configured to indicate the disabled mode as the target mode associated with the communication module if the voltage on the disable pin falls within the first one of the plurality of operational windows, a second comparator configured to indicate whether the voltage on the disable pin falls within the second one of the plurality of operational windows, and a third comparator configured to indicate whether the voltage on the disable pin falls within the third one of the plurality of operational windows. Additionally, the comparator stage may further comprise one or more delay elements configured to indicate one or more of the scan mode or the test as the target mode associated with the communication module if the second comparator indicates that the voltage on the disable pin falls within the second or third one of the plurality of operational windows for longer than a predetermined delay. In one embodiment, the circuit may further comprise one or more inverters coupled to outputs from one or more of the first comparator or the second comparator, wherein the one or more inverters may generate signals to enable one or more of the second comparator or the third comparator if the output from the first comparator indicates that the voltage on the disable pin does not fall within the first one of the plurality of operational windows and/or the voltage on the disable pin does not fall within the second one of the plurality of operational windows.

Other objects and advantages associated with the embodiments relating to the multiple hardware interrupt functionality described herein will be apparent to those skilled in the art based on the accompanying drawings and detailed description.

BRIEF DESCRIPTION OF THE DRAWINGS

The accompanying drawings are presented to aid in the description of the embodiments disclosed herein and are provided solely to illustrate exemplary features associated with the disclosed embodiments without define any limitations thereof.

DETAILED DESCRIPTION

Aspects are disclosed in the following description and related drawings to show specific examples relating to various exemplary embodiments of multiple hardware interrupt functionality that may be used in near-field communication (NFC) devices. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The terms "wireless power" or "NFC" may be used herein to refer to any form of energy associated with electric fields, magnetic fields, electromagnetic fields, or other energy transferred from a transmitter to a receiver without using physical electromagnetic conductors. In one embodiment, power conversion may be used in a system described herein to wirelessly transfer energy between devices, which may include mobile phones, cordless phones, iPods, MP3 players, headsets, or other suitable communication devices, for example. In generally, one principle underlying wireless energy transfer may include magnetic coupled resonance (i.e., resonant induction) using frequencies, for example, below 30 MHz. However, various other frequencies may be suitably employed, including frequencies where license-exempt operation at relatively high radiation levels is permitted, for example, at either below 135 kHz (LF) or at 13.56 MHz (HF). At these frequencies, which are commonly used in radio frequency identification (RFID) systems, communication devices must comply with interference and safety standards such as EN 300330 in Europe or FCC Part 15 norm in the United States. By way of illustration and not limitation, the abbreviations "LF" and "HF" are used herein to refer to $f_0$=135 kHz and $f_0$=13.56 MHz, respectively.

The term "NFC" (or "near-field communication") may also be used herein to refer to RFID functionality, whereby the terms "NFC" and "RFID" may be used interchangeability where compatible functionality allows for such substitution. As such, the use of one term or the other should not be considered limiting.

The term "transceiver" may also be used herein to refer to the functionality associated with a transponder and the terms "transceiver" and "transponder" may be used interchangeability where compatible functionality allows for such substitution. As such, the use of one term over or the other should not be considered limiting.

Figure 1:
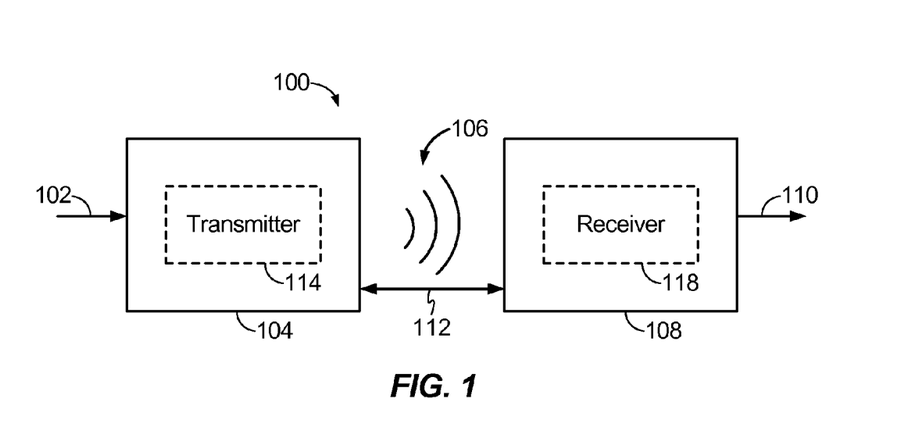
FIG. 1 illustrates a block diagram that represents an exemplary near-field communication system, according to one embodiment.

According to one embodiment, FIG. 1 illustrates a block diagram that represents an exemplary NFC system 100 in which the multiple hardware interrupt functionality described herein may be used. In one embodiment, input power 102 may be provided to a transmitter 104 that uses the input power 102 to generate a magnetic field 106 for providing energy transfer. A receiver 108 may couple to the magnetic field 106 and generate an output power 110 that may be stored or consumed by a device (not shown) coupled to the output power 110. In one embodiment, the receiver 108 may be external to the device that stores or consumes the output power 110, or the receiver 108 may alternatively be integral to the device that stores or consumes the output power 110. Furthermore, in one embodiment, the transmitter 104 may be coupled to or integral to another device that provides the energy transfer to the receiver 108. In one embodiment, the transmitter 104 and the receiver 108 may be separated by a distance 112 and configured according to a mutual resonant relationship. Accordingly, when the resonant frequency of the receiver 108 and the resonant frequency of the transmitter 104 match, transmission losses between the transmitter 104 and the receiver 108 are minimal when the receiver 108 is located in the "near-field" of the magnetic field 106.

In one embodiment, the transmitter 104 may further includes a transmit antenna 114 that can provide a means to transmit energy and the receiver 108 may further include a receive antenna 118 that can provide a means to receive transmitted energy or couple to transmitted energy. The transmit antenna 114 and the receive antennas 118 may be sized according to applications and devices associated therewith. As stated, an efficient energy transfer may occur in the near-field via coupling a large portion of the energy in the near-field of the transmit antenna 114 to the receive antenna 118 rather than propagating most of the energy in an electromagnetic wave to the far-field. In this near-field, a coupling may be established between the transmit antenna 114 and the receive antenna 118, wherein the area around the transmit antenna 114 and the receive antenna 118 where this near-field coupling occurs may be referred to herein as a coupling-mode region.

Figure 2:
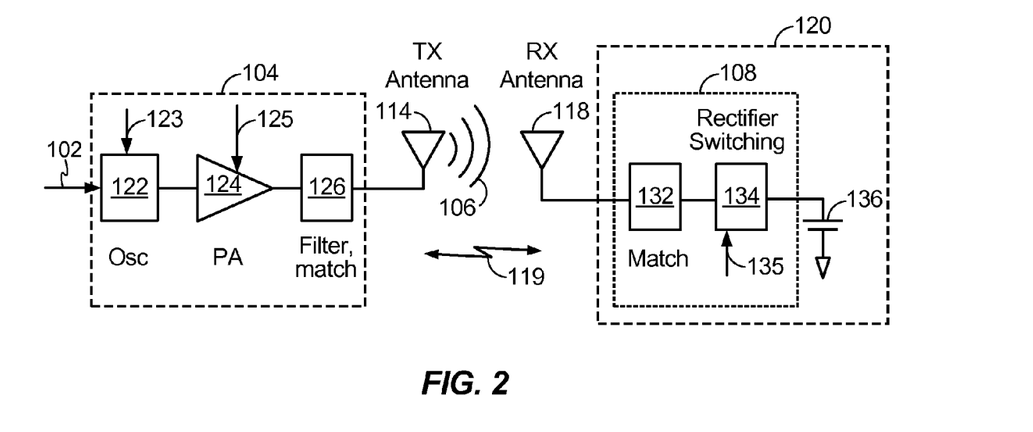
FIG. 2 illustrates a schematic diagram corresponding to the exemplary near-field communication system illustrated in FIG. 1, according to one embodiment.

According to one embodiment, FIG. 2 illustrates a schematic diagram showing further detail corresponding to the NFC system 100 illustrated in FIG. 1 and described herein. More particularly, in one embodiment, the transmitter 104 driven by the input power 102 may include an oscillator 122, a power amplifier or power stage 124, and a filter and match circuit 126. The oscillator 122 may be configured to generate an oscillator signal at a desired frequency, which may be adjusted in response to an adjustment signal 123. The oscillator signal may be amplified by the power amplifier 124 with a power output responsive to a control signal 125. The filter and match circuit 126 may be included to filter out harmonics or other unwanted frequencies and match the impedance of the transmitter 104 to the transmit antenna 114. In one embodiment, the receiver 108 may be coupled to or integral to an electronic device 120, and the receiver 108 may further include a matching circuit 132 that can the impedance of the receiver 108 to the receive antenna 118. Additionally, in one embodiment, the receiver 108 may include a rectifier and switching circuit 134 to generate a power output 136 according to a control signal 135, which may be used, for example, to charge a battery in the electronic device 120, power host electronics in the electronic device 120, or otherwise supply power that may be stored or consumed in the electronic device 120.

In one embodiment, a communication channel 119 may also exist between the transmitter 104 and the receiver 108. As described herein, the communication channel 119 may be a NFC channel. Further, in one embodiment, the communication channel 119 may be implemented separately from the magnetic field 106, or alternatively the communication channel 119 may be combined with or otherwise associated with the magnetic field 106. In one embodiment, a communication channel 119 may also exist between the transmitter 104 and the receiver 108. As described herein, the communication channel 119 may be a NFC channel. Further, in one embodiment, the communication channel 119 may be implemented separately from the magnetic field 106, or alternatively the communication channel 119 may be combined with or otherwise associated with the magnetic field 106.

In one embodiment, a suitable antenna used in one or more embodiments described herein may be configured as a "loop" antenna, which may also be referred to as a "magnetic," "resonant," or "magnetic resonant" antenna. In general, loop antennas may be configured to include an air core or a physical core such as a ferrite core, wherein an air core loop antenna may allow the placement of other components within the core area. In addition, an air core loop may more readily enable placement of the receive antenna 118 within a plane of the transmit antenna 114 where the coupled-mode region of the transmit antenna 114 may be more effective. In one embodiment, as noted above, energy may be efficiently transferred between the transmitter 104 and the receiver 108 during matched or nearly matched resonance between the transmitter 104 and the receiver 108. However, even when resonance between the transmitter 104 and receiver 108 are not matched, energy may be transferred at a lower efficiency. In general, the energy transfer may occur via coupling energy from the near-field of the transmit antenna 114 to the receive antenna 118 when residing in the neighborhood where this near-field is established rather than propagating the energy from the transmit antenna 114 into free space (or the "far-field").

In one embodiment, the resonant frequency of the loop antennas may be based on inductance and capacitance, wherein inductance in a loop antenna may generally refer to the inductance created by the loop, whereas capacitance may generally be added to the inductance in the loop antenna to create a resonant structure at a desired resonant frequency. For example, in one embodiment, one or more capacitors may be added to the transmit antenna 114 and/or the receive antenna 118 to create a resonant circuit that generates a sinusoidal or quasi-sinusoidal signal. In another example, a capacitor may be placed in parallel between two terminals of the loop antenna. Accordingly, for larger diameter loop antennas, the size of the capacitance needed to induce resonance decreases as the diameter or inductance of the loop increases. Furthermore, as the diameter of the loop antenna increases, the efficient energy transfer area of the near-field increases for "vicinity" coupled devices. Of course, those skilled in the art will appreciate that other resonant circuits are possible and the resonant signal for the transmit antenna 114 may be an input to the loop antenna.

Having provided the above general overview relating to how different devices that support NFC may communicate with one another in the near-field, exemplary embodiments relating to multiple hardware interrupt functionality that may be used on NFC will now be described. More particularly, NFC devices may generally include an NFC module that can operate in different modes, which may include an "active mode" or "normal mode" in which the NFC device actively transmits a signal (e.g., a data signal). In addition, the modes may include a "passive mode" or "listening mode" in which rather than actively transmitting signals, the NFC device may periodically scan the near-field for signals from other devices attempting to detect the NFC device or establish a connection therewith. Additionally, the modes in which the NFC device can operate may further include a TEST mode and a SCAN mode that may be used to verify that the NFC module operates correctly (e.g., during design or manufacture processes) or to diagnose problems, update firmware, or perform any other suitable process that may need to operate or otherwise establish interaction with the NFC module (e.g., via communicating data signals in the event that internal regulators associated with a power management module (PMM) cannot suitably get digital components of the chip that are meant for inter-integrated circuit ($I^2C$) communication out of reset). Moreover, in certain cases, a DISABLE mode may be used to entirely disable or otherwise turn off the NFC module (e.g., when the battery associated with the NFC device has a charge level below a certain threshold, in response to a user manually switching the NFC module via a hardware switch or inputs to a user interface, etc.). To that end, the PMM may include or otherwise be connected to a disable pin used to provide a hardware interrupt that can transition the NFC module to a low current consumption mode (e.g., the DISABLE mode). Accordingly, the exemplary embodiments described in further detail below may use the hardware interrupt functionality associated with the disable pin to generate control signals that can be used to transition the NFC module into various target modes in addition to (and/or instead of) the DISABLE mode.

Figure 3:
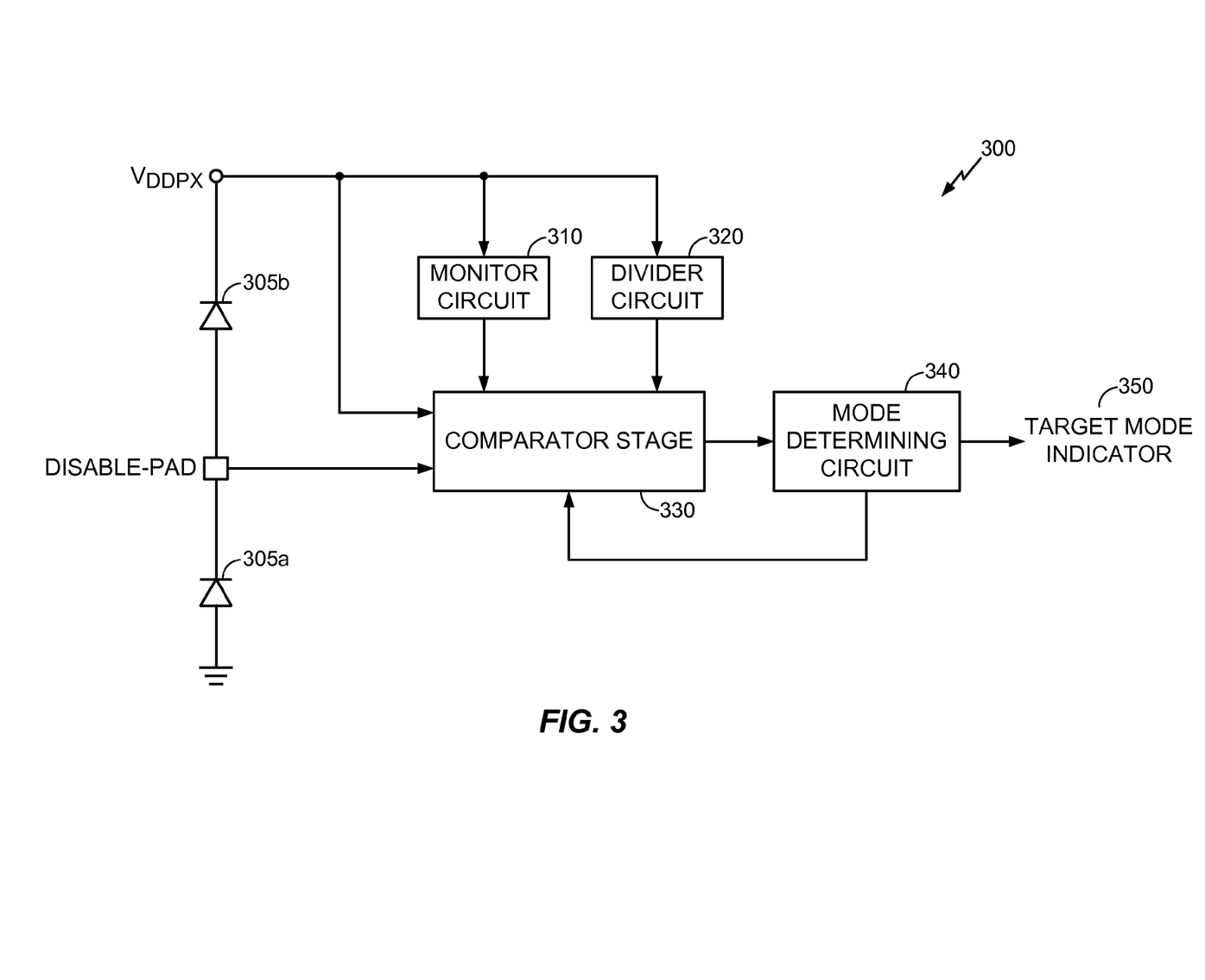
FIG. 3 illustrates a block diagram representing an exemplary circuit that may be used in a power management module to enable multiple hardware interrupt functionality on near-field communication, according to one embodiment.

For example, according to one embodiment, FIG. 3 illustrates a block diagram representing an exemplary circuit 300 that may be used in a PMM to enable multiple hardware interrupt functionality on NFC. In one embodiment, the circuit 300 shown in FIG. 3 may include a disable pin that may be used to generate a hardware interrupt to transition the NFC module into a low current consumption mode (e.g., the DISABLE mode). In one embodiment, the disable pin may be coupled to a pad voltage supply, referred to herein as DISABLE_pad, which may generally comprise a digital signal that a mobile system modem (MSM) or other suitable host drives during normal operations with a digital rail-to-rail signal (VDDP) that swings between 0V and voltage in an input/output (I/O) domain associated with the MSM or other host that drives the DISABLE_pad signal, which may be referred to herein as VDDPX. For example, in one embodiment, the MSM or other host that drives the DISABLE_pad signal may have an I/O rail that operates in a 1.8V voltage domain, whereby typical operations that only use the disable pin to transition into the DISABLE mode may drive the DISABLE_pad voltage on the disable pin with a 1.8V digital rail-to-rail signal.

However, as noted above, the circuit 300 shown in FIG. 3 may use the hardware interrupt functionality associated with the disable pin to generate control signals that can be used to transition the NFC module into the DISABLE mode and various additional target modes, which may include the SCAN mode, the TEST mode, or other suitable modes. Accordingly, the circuit 300 shown in FIG. 3 may minimize pin counts because one pin (e.g., the disable pin) can be used to transition the NFC module into multiple different modes rather than requiring additional separate pins for the SCAN mode, the TEST mode, or any other target modes that can be transitioned to using the circuit 300. Furthermore, the circuit 300 shown in FIG. 3 may enable self-sufficient testability for the NFC module and associated components because any chips that host the NFC module and the associated components can be started up without necessarily requiring any internal voltage regulators, power supply, or internally generated bias currents or voltages, or that any internal regulators or references associated therewith are working. Instead, the NFC module and associated components may be tested simply by supplying external voltage VDDP on the disable pin and external voltage VDDPX on the I/O rail, thereby increasing the observability associated with the PMM during debugging or other management functions. For ease of description, the following discussion will focus on how the hardware interrupt functionality associated with the disable pin may be used to generate different control signals to transition the NFC module into the DISABLE mode, the SCAN mode, and the TEST mode. As such, those skilled in the pertinent art will appreciate that the same or substantially similar mechanisms associated with the circuit 300 shown in FIG. 3 may be used to transition the NFC module into additional target modes, different target modes, or otherwise depending on the particular application.

In one embodiment, to generate the control signals to transition the NFC module into the DISABLE, SCAN, or TEST modes, the MSM or other host that drives the DISABLE_pad signal may be configured to generate an intermediate voltage on the disable pin. In particular, as noted above, the DISABLE_pad voltage may generally swing between 0V and 1.8V during normal operations such that the NFC module may transition into the DISABLE mode in response to the DISABLE_pad voltage exceeding a certain threshold value within the 0V to 1.8V window. As such, in one embodiment, multiple intermediate windows may therefore be defined in order to use the hardware interrupt functionality associated with the disable pin to transition into the SCAN or TEST modes in addition to the DISABLE mode. For example, in one embodiment, an intermediate window from 0.45V to 0.9V may be used to transition the NFC module to the TEST mode, an intermediate window from 0.9V to 1.35V may be used to transition the NFC module to the SCAN mode, and an intermediate window from 1.35V to 1.8V may be used to transition the NFC module to the DISABLE mode. In one embodiment, the circuit 300 may rely on precise voltage supplies in a test setup, whereby the MSM or other host may be configured to supply the DISABLE_pad voltage at mid-window values to be insensitive to noise and ensure that a comparator stage 330 has sufficient common input modes to detect the SCAN and TEST modes (e.g., the DISABLE_pad voltage may be driven to approximately 0.675V, 1.125V, and 1.575V to transition to the TEST mode, the SCAN mode, and the DISABLE mode, respectively).

Furthermore, in one embodiment, the circuit 300 may include a mode determining circuit 340 that may delay setting a control signal (e.g., target mode indicator 350) to the SCAN mode or the TEST mode in order to avoid accidentally triggering a transition to either mode during normal operation (i.e., when the voltage on the disable pin was intended to transition NFC components associated with the NFC device to the DISABLE mode). For example, in one embodiment, in response to the comparator stage 330 detecting that the DISABLE_pad voltage has a value within the intermediate windows associated with the SCAN mode or the TEST mode, the mode determining circuit 340 may only set the target mode indicator 350 to the SCAN mode or the TEST mode if the DISABLE_pad voltage remains within the appropriate window longer than a certain delay period (e.g., between approximately 40 and 100 μs). Further to that end, in one embodiment, outputs from the comparator stage 330 may be delayed approximately 50 μs to avoid inadvertent triggers to either the SCAN mode or the TEST mode. It should be further noted that the rise time associated with the rail-to-rail voltage on the disable pin may be in the order of tens of nanoseconds (ns), meaning that the rise time may generally be approximately 10 ns (although those skilled in the art will appreciate that process and temperature variations may increase the rise time, e.g., to approximately 50 ns). In one embodiment, the delay period may therefore have a sufficient length that may prevent inadvertently triggering a transition into the SCAN mode or the TEST mode (e.g., based on the rise time associated with the rail-to-rail voltage on the disable pin). Additionally, in one embodiment, the circuit 300 may implement a constraint that the DISABLE_pad voltage to transition to the DISABLE mode should be in the I/O voltage domain (e.g., the target mode indicator 350 may be set to the DISABLE mode if the DISABLE_pad voltage is above 1.35V and no more than 1.8V).

In operation, the circuit 300 may generally receive the DISABLE_pad signal on the disable pin and an external voltage supply VDDPX in an I/O voltage domain associated with the appropriate host that drives the DISABLE_pad signal. In one embodiment, the circuit may further include one or more electrostatic discharge (ESD) diodes (e.g., ESD diodes 305a-b) to protect sensitive electronic components in the circuit 300 against damage that may be caused from spikes in voltage. Furthermore, in one embodiment, the VDDPX voltage supply may be coupled to a monitor circuit 310, a divider circuit 320, and the comparator stage 330. In one embodiment, the monitor circuit 310 may implement coarse detection to sense whether VDDPX exceeds a certain threshold (e.g., approximately 1.5V) and output an enabling signal to the comparator stage 330 when VDDPX exceeds the threshold. For example, in one embodiment, the monitor circuit 310 may generate the enabling signal if VDDPX>Vtn+|Vtp|, where Vtn and Vtp generally refer to threshold voltages that are required to have n-type metal-oxide-semiconductor (nMOS) and p-type metal-oxide-semiconductor (pMOS) comparators used in the comparator stage 330 work properly.

In one embodiment, the divider circuit 320 may be coupled to VDDPX running off the I/O rail, wherein the divider circuit 320 may generate multiple reference voltages that are input to the comparator stage 330 (e.g., a first reference voltage at VDDPX/4, a second reference voltage at VDDPX/2, and a third reference voltage at 3VDDPX/4). In one embodiment, the reference voltages generated with the divider circuit 320 may then be input to the comparator stage 330, which may include separate comparators that compare the DISABLE_pad voltage on the disable pin against the respective reference voltages input from the divider circuit 320. Accordingly, the comparators in the comparator stage 330 may output a signal to the mode determining circuit 340 that indicates whether the DISABLE_pad voltage falls within one of the windows that trigger the transitions to the TEST mode, the SCAN mode, and the DISABLE mode. Furthermore, as noted above, the signal output from the comparator stage 330 may be delayed approximately 50 is if the DISABLE_pad voltage falls within the window associated with either the TEST mode or the SCAN mode to avoid falsely or otherwise inadvertently triggering a transition thereto. In one embodiment, as will be described in further detail below, the mode determining circuit 340 may then process the signal output from the comparator stage 330 to generate one or more additional reference signals that are provided to the comparator stage 330 and generate the target mode indicator 350 to trigger a transition to one of the TEST, SCAN, or DISABLE modes based on whether the output signal meets certain criteria. The target mode indicator 350 may then be provided to the NFC module or otherwise used to transition the NFC module to the appropriate target mode.

Figure 4:
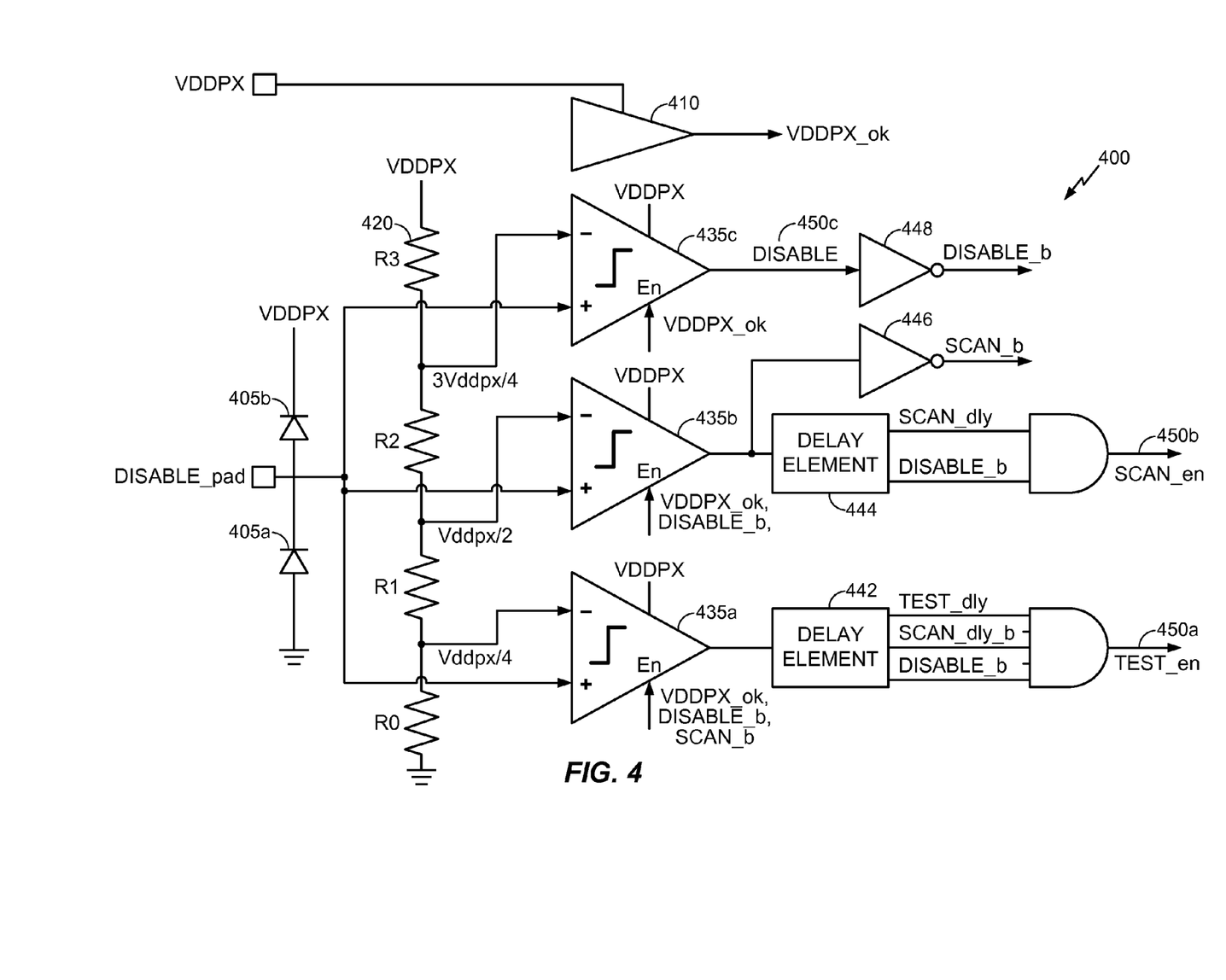
FIG. 4 illustrates an exemplary circuit to enable multiple hardware interrupt functionality on near-field communication, according to one embodiment.

According to one embodiment, FIG. 4 illustrates an exemplary circuit 400 to enable multiple hardware interrupt functionality on NFC, wherein the circuit 400 may provide substantially similar functionality to the circuit 300 shown in FIG. 3 and described in further detail above and provide additional detail relating thereto. As such, for brevity and ease of description, various details relating to the circuit 400 shown in FIG. 4 may be omitted to the extent that the same or substantially similar details have been provided above in relation to FIG. 3.

More particularly, in one embodiment, the circuit 400 shown in FIG. 4 may similarly receive the DISABLE_pad signal on the disable pin and the external voltage supply VDDPX, wherein the external voltage supply VDDPX may be coupled to the disable pin, a monitor circuit 410, a divider circuit 420, and a comparator stage that includes multiple comparators (e.g., comparators 435a, 435b, and 435c). In addition, the circuit 400 may include ESD diodes 405a and 405b arranged between the disable pin and the external voltage supply VDDPX to protect various components in the circuit 400 against damage that may be caused from voltage spikes. In particular, the ESD diodes 405a and 405b may generally protect sensitive components in the circuit 400 from damage or other issues that may arise if the DISABLE_pad signal and/or the external voltage supply VDDPX experience a spike in voltage.

In one embodiment, as noted above, the monitor circuit 410 may monitor the VDDPX voltage supply to sense whether VDDPX has a value that exceeds a certain threshold value that may be required to properly operate the comparators 435a, 435b, and 435c that indicate whether the DISABLE_pad voltage falls within one of the windows that trigger the transitions to the TEST mode, the SCAN mode, and the DISABLE mode, respectively. For example, in one embodiment, the threshold value may be Vtn+|Vtp|, where Vtn and Vtp refer to threshold voltages that are required to properly operate nMOS and pMOS transistors used in the comparators 435a-c. Accordingly, the monitor circuit 410 may generate an enabling signal, referred to herein as VDDPX_ok, that indicates whether VDDPX exceeds the threshold value (i.e., if VDDPX exceeds the threshold value, the VDDPX_ok enabling signal may be set to '1' or a logic high, otherwise VDDPX_ok may be set to '0' or a logic low if VDDPX does not exceed the threshold value). Furthermore, in one embodiment, the monitor circuit 410 may have an architecture that includes one or more buffer components to provide coarse detection relating to whether VDDPX exceeds a sum of the nMOS and pMOS threshold values, wherein this architecture may be chosen over a comparator with internally generated reference voltages and currents to ensure that the internal bias circuits need not work in order to enable the I/O circuitry associated with the DISABLE_pad pin.

In one embodiment, as noted above, the divider circuit 420 may be coupled to VDDPX and generate multiple reference voltages that are input to the comparators 435a, 435b, and 435c. In particular, the divider circuit 420 may generate a first reference voltage at VDDPX/4, a second reference voltage at VDDPX/2, and a third reference voltage at 3VDDPX/4. In one embodiment, the first, second, and third reference voltages may supplied to negative inputs of comparators 435a, 435b, and 435c, respectively, while the DISABLE_pad signal may be supplied to positive inputs on each of comparators 435a, 435b, and 435c. Accordingly, comparators 435a, 435b, and 435c may compare the DISABLE_pad voltage received on the respective positive inputs to the reference voltage received on the respective negative inputs from the divider circuit 420 to determine whether the DISABLE_pad voltage falls within one of the voltage windows associated with the TEST mode, the SCAN mode, and the DISABLE mode. For example, as noted above, the TEST mode may be associated with a voltage window from 0.45V to 0.9V (between VDDPX/4 and VDDPX/2), the SCAN mode may be associated with a voltage window from 0.9V to 1.35V (between VDDPX/2 and 3VDDPX/4), and the DISABLE mode may be associated with a voltage window from 1.35V to 1.8V (between 3VDDPX/4 and VDDPX). It should be further noted that although FIG. 4 shows the divider circuit 420 having four resistors R0-R4 that are arranged in series, the divider circuit 420 may have other architectures that can suitably generate the reference voltages that are input to the comparators 435a, 435b, and 435c (e.g., four transistors that are connected in series and have sources, drains, and gates that are connected to one another and to VDDPX and ground in a manner that enables the divider circuit 420 to generate the appropriate reference voltages).

In one embodiment, as noted above, the reference voltages supplied from the divider circuit 420 may generally provide the comparators 435a, 435b, and 435c with the appropriate reference values to compare to the DISABLE_pad voltage and determine whether the DISABLE_pad voltage exceeds the corresponding reference value. In addition, the comparators 435a, 435b, and 435c may be coupled between supply voltage VDDPX and one or more reference signals on an enable input that controls whether or not each comparator 435a, 435b, and 435c is enabled. For example, as noted above, the monitor circuit 410 may generate the VDDPX_ok signal to indicate whether VDDPX exceeds a threshold value that may be required to properly operate the comparators 435a-c, wherein the reference signals on the enable inputs associated with each of the comparators 435a-c may include the VDDPX_ok signal. Additionally, as shown in FIG. 4, the enable input associated with comparator 435b may further include a DISABLE_b reference signal that depends on the output from comparator 435c, while the enable input associated with comparator 435a may further include the DISABLE_b reference signal and an additional SCAN_b reference signal that depends on the output from comparator 435b.

For example, in operation, if VDDPX_ok has been set to '1' or logic high, comparator 435c may be enabled and compare the DISABLE_pad voltage received on the positive input to the 3VDDPX/4 reference voltage received on the negative input and the VDDPX reference voltage. Accordingly, if the DISABLE_pad voltage has a value between the 3VDDPX/4 reference voltage and the VDDPX reference voltage, comparator 435c may set a DISABLE output signal 450c to '1' or logic high. Otherwise, if the DISABLE_pad voltage has a value that does not fall between the 3VDDPX/4 and VDDPX reference voltages, comparator 435c may set the DISABLE output signal 450c to '0' or logic low. Furthermore, the DISABLE output signal 450c may be coupled to an inverter 448 that generates the DISABLE_b reference signal, which may be set to '1' or logic high if the DISABLE output signal 450c is set to '0' or logic low or alternatively to '0' or logic low if the DISABLE output signal 450c is set to '1' or logic high. Accordingly, the DISABLE_b reference signal may be supplied to the enable input of comparators 435a and 435b such that comparators 435a and 435b may be enabled if the DISABLE output signal 450c is set to '0' or logic low and VDDPX_ok has been set to '1' or logic high.

In one embodiment, as noted above, comparator 435b may be enabled if both the DISABLE_b output signal 450c and the VDDPX_ok signal have been set to '1' or logic high, in which case comparator 435b may compare the DISABLE_pad voltage received on the positive input to the VDDPX/2 reference voltage. Accordingly, if the DISABLE_pad voltage has a value above the VDDPX/2 reference voltage, comparator 435b may set a SCAN output signal (not shown) to '1' or logic high. It should be noted that comparator 435b may not compare the DISABLE_pad voltage to the 3VDDPX/4 value associated with the relevant window because comparator 435c would have set the DISABLE_b signal to '0' or logic low if DISABLE_pad exceeded 3VDDPX/4. In one embodiment, the SCAN output signal may be supplied to a delay element 444 that sets a SCAN_dly signal to '1' or logic high if the SCAN output signal remains within the VDDPX/2 to 3VDDPX/4 window longer than a certain delay period (e.g., approximately 40 to 100 μs). The SCAN_dly signal and the DISABLE_b signal may be coupled to an AND gate that then sets a SCAN_en output signal 450b to '1' or logic high if both the SCAN_dly signal and the DISABLE_b signal are set to '1' or logic high. Otherwise, if either the SCAN_dly signal or the DISABLE_b signal are set to '0' or logic low, the SCAN_en output signal 450b may be set to '0' or logic low. Furthermore, the SCAN output signal may be coupled to an inverter 446 that generates the SCAN_b reference signal, which may be set to '1' or logic high if the SCAN output signal is set to '0' or logic low or alternatively to '0' or logic low if the SCAN output signal is set to '1' or logic high. Accordingly, the SCAN_b reference signal may be supplied to the enable input of comparator 435a such that comparator 435a may be enabled if the DISABLE output signal 450c and the SCAN output signal are both set to '0' or logic low and VDDPX_ok has been set to '1' or logic high.

In one embodiment, if the VDDPX_ok, DISABLE_b, and SCAN_b reference signals have all been set to '1' or logic high, comparator 435a may compare the DISABLE_pad voltage on the positive input associated therewith to the VDDPX/4 reference voltage on the negative input associated therewith. Accordingly, if the DISABLE_pad voltage has a value that exceeds VDDPX/4, comparator 435a may set a TEST output signal (not shown) to '1' or logic high. In one embodiment, the TEST output signal may be supplied to a delay element 442 that sets a TEST_dly signal to '1' or logic high if the TEST output signal remains within the VDDPX/4 to VDDPX/2 window longer than a certain delay period (e.g., approximately 40 to 100 ms). In one embodiment, the TEST_dly signal and the DISABLE_b signal may be coupled to an AND gate, and the SCAN_dly signal may be inverted to produce a SCAN_dly_b further coupled to the AND gate. In one embodiment, the AND gate coupled to delay element 442 may then set a TEST_en output signal 450a to '1' or logic high if the TEST_dly signal, the DISABLE_b signal, and the SCAN_dly_b signal are all set to '1' or logic high. Otherwise, if one or more of the TEST_dly signal, the DISABLE_b signal, or the SCAN_dly_b signal are set to '0' or logic low, the TEST_en output signal 450a may be set to '0' or logic low.

In one embodiment, in response to having suitably generated the TEST_en output signal 450a, the SCAN_en output signal 450b, and the DISABLE output signal 450c, the various output signals 450a-c may then be supplied to a PMM or other suitable component that uses the output signals 450a-c to place the NFC module in appropriate state. For example, in one embodiment, the NFC module may be entirely disabled if the DISABLE output signal 450a has been set to '1' or logic high, or the NFC module may be alternatively placed in a SCAN or TEST mode if the SCAN_en output signal 450b or the TEST_en output signal 450a have been set to '1' or logic high, respectively. Furthermore, it should be noted that the various enable inputs associated with the comparators 435a-c may be arranged in a manner to ensure that at most one of the TEST_en output signal 450a, the SCAN_en output signal 450b, or the DISABLE output signal 450c will be set to '1' or logic high.

Figure 5:
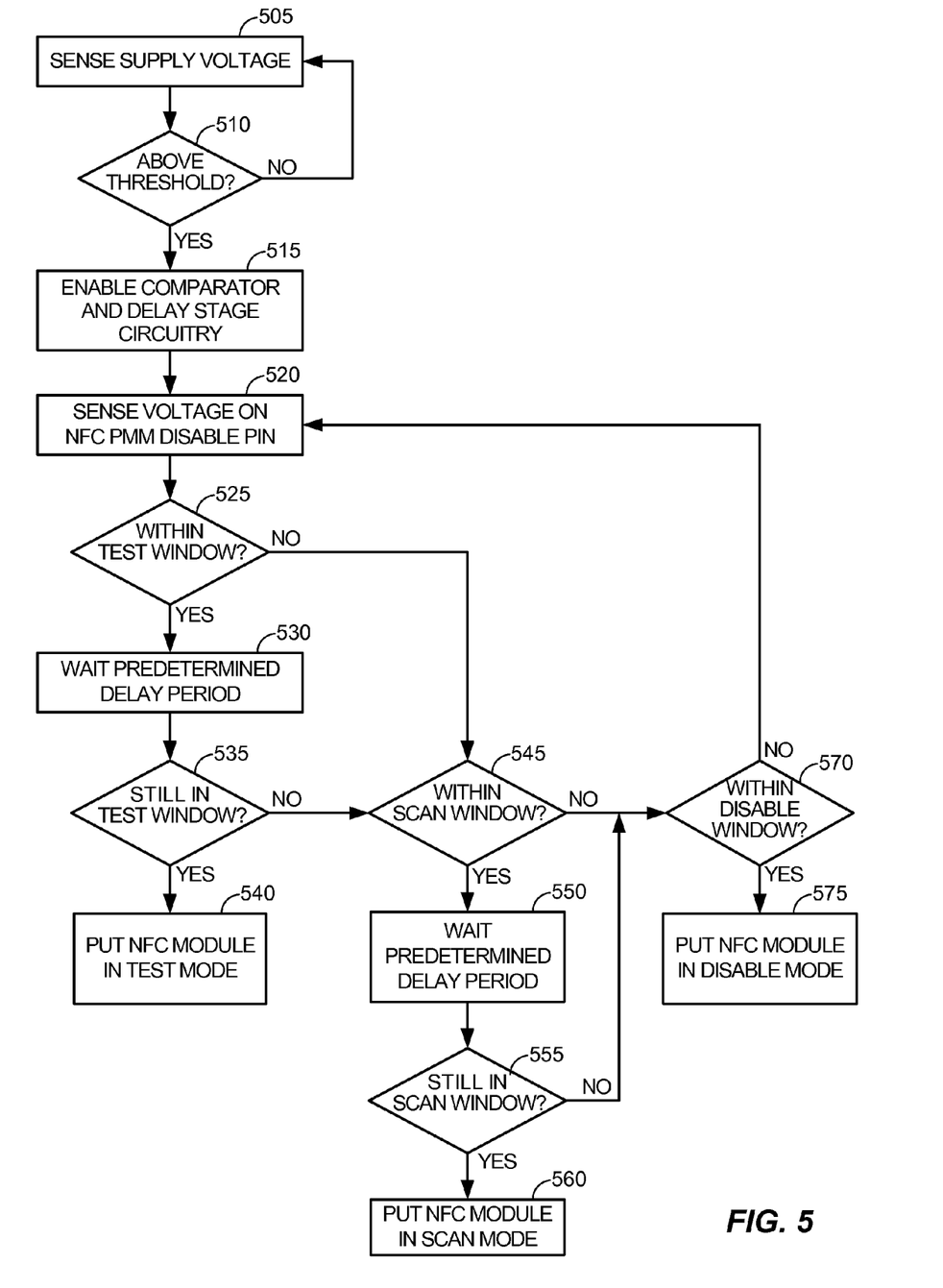
FIG. 5 illustrates an exemplary method to enable multiple hardware interrupt functionality on near-field communication, according to one embodiment.

According to one embodiment, FIG. 5 illustrates an exemplary method to enable multiple hardware interrupt functionality on NFC, wherein the method shown therein may provide substantially similar functionality to the circuits shown in FIGS. 3-4 described in further detail above. As such, for brevity and ease of description, various details relating to the method shown in FIG. 5 may be omitted to the extent that the same or substantially similar details have been provided above in relation to FIGS. 3-4.

In one embodiment, the method shown in FIG. 5 may include sensing a supply voltage VDDPX at block 505 and subsequently determining whether the supply voltage VDDPX exceeds a certain threshold value at block 510. For example, in one embodiment, the threshold value compared to the supply voltage VDDPX may be a voltage required to properly operate comparator stage circuitry that generates one or more indicators to trigger transitioning an NFC module from one state to another. Accordingly, in response to determining that the sensed supply voltage VDDPX exceeds the threshold value, an enabling signal VDDPX_ok may be generated at block 515 to enable the comparator stage circuitry. Otherwise, if the sensed supply voltage VDDPX does not exceed the threshold value, the method may return to block 505 to sense the supply voltage VDDPX until the threshold value has been exceeded and the comparator stage circuitry has been suitably enabled.

Furthermore, in one embodiment, enabling the comparator stage circuitry may further include generating multiple reference voltages that are input to the comparator stage circuitry. For example, in one embodiment, the reference voltages may include a first reference voltage at VDDPX/4, a second reference voltage at VDDPX/2, and a third reference voltage at 3VDDPX/4. In one embodiment, voltage on an NFC PMM disable pin may then be sensed at block 520, wherein the voltage on the disable pin may be referred to herein as a DISABLE_pad signal. The comparator stage circuitry may then compare the DISABLE_pad signal to the reference voltages to determine whether DISABLE_pad falls within a voltage window associated with a TEST mode, a SCAN mode, and/or a DISABLE mode. For example, as noted above, the TEST mode may be associated with a voltage window from VDDPX/4 to VDDPX/2, the SCAN mode may be associated with a voltage window from VDDPX/2 to 3VDDPX/4, and the DISABLE mode may be associated with a voltage window from 3VDDPX/4 to VDDPX.

In one embodiment, if the supply voltage VDDPX exceeds the threshold and the comparator stage circuitry has been suitably enabled, the comparator stage circuitry may determine whether the DISABLE_pad voltage falls between the VDDPX/4 and VDDPX/2 reference voltages at block 525 to determine whether the DISABLE_pad voltage falls within the TEST mode window. In one embodiment, if the DISABLE_pad voltage falls within the TEST mode window, a delay element may wait a predetermined delay period at block 530 (e.g., approximately 40 to 100 µs) and another determination may be made at block 535 to determine whether the DISABLE_pad voltage still falls within the TEST mode window. In one embodiment, in response to determining that the DISABLE_pad voltage still falls within the TEST window at block 535, the NFC module may be put in the TEST mode after the delay period at block 540. As such, the NFC module may generally be put in the TEST mode if the DISABLE_pad voltage remains within the TEST mode window for longer than the predetermined delay period.

Otherwise, in response to determining that the DISABLE_pad voltage does not fall between the VDDPX/4 and VDDPX/2 reference voltages at block 525, or alternatively in response to determining that the DISABLE_pad voltage no longer falls between the VDDPX/4 and VDDPX/2 reference voltages after the predetermined delay period at block 535, the comparator stage circuitry may determine whether the DISABLE_pad voltage falls between the VDDPX/2 and 3VDDPX/4 reference voltages at block 545 to determine whether the DISABLE_pad voltage falls within the SCAN mode window. In one embodiment, if the DISABLE_pad voltage falls within the SCAN mode window, a delay element may similarly wait the predetermined delay period at block 550 and another determination may be made at block 555 to determine whether the DISABLE_pad voltage still falls within the SCAN mode window. In one embodiment, in response to determining that the DISABLE_pad voltage still falls within the SCAN window at block 555, the NFC module may be put in the SCAN mode after the delay period at block 560. As such, the NFC module may similarly be put in the SCAN mode if the DISABLE_pad voltage remains in the SCAN mode window for longer than the predetermined delay period.

In one embodiment, in response to determining that the DISABLE_pad voltage does not fall between the VDDPX/2 and 3VDDPX/4 reference voltages at block 545, or alternatively in response to determining that the DISABLE_pad voltage no longer falls between the VDDPX/2 and 3VDDPX/4 reference voltages after the predetermined delay period at block 555, the comparator stage circuitry may determine whether the DISABLE_pad voltage falls between the 3VDDPX/4 reference voltage and the VDDPX reference voltage at block 570 to determine whether the DISABLE_pad voltage falls within the DISABLE mode window. In one embodiment, in response to determining that the DISABLE_pad voltage falls within the DISABLE mode window, the NFC module may be put into the DISABLE mode at block 575 (i.e., the PMM may disable all modules associated with NFC). Otherwise, if block 570 results in a determination that the DISABLE_pad voltage does not fall within the DISABLE mode window (e.g., the DISABLE_pad voltage exceeds the VDDPX reference voltage and therefore resides outside the I/O voltage domain), the method shown in FIG. 5 may return to block 520 to again sense the voltage on the NFC PMM disable pin and determine whether to put the NFC module in one of the TEST, SCAN, or DISABLE modes.

Figure 6:
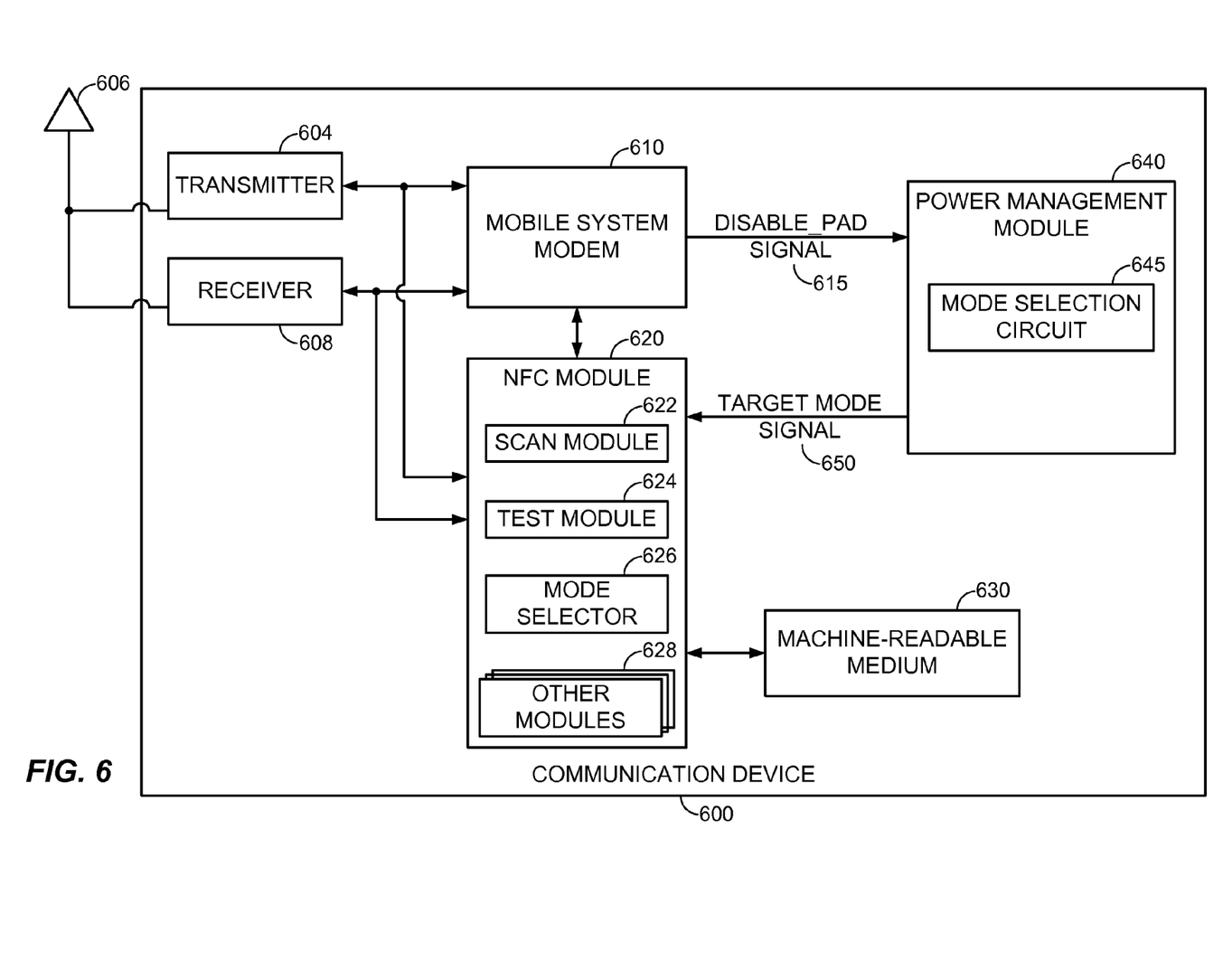
FIG. 6 illustrates an exemplary communication device that may support near-field communication and enable multiple hardware interrupt functionality on the supported near-field communication, according to one embodiment.

According to one embodiment, FIG. 6 illustrates an exemplary communication device 600 that may support NFC and enable multiple hardware interrupt functionality on the supported NFC. In one embodiment, communication device 600 may comprise any known and suitable electronic device. As non-limiting examples, communication device 600 may comprise a cellular telephone, a portable media player, a camera, a gaming device, a navigation device, a headset (e.g., a Bluetooth headset), a tool, a toy, or any combination thereof. As described in further detail above and below, communication device 600 may include an NFC module 620 that can be disabled (i.e., with all modules associated therewith turned off) or operate in various different modes. Furthermore, in one embodiment, the communication device 600 may be configured to wirelessly communicate with at least one electronic device via antenna 606. For example, communication device 600 may be configured to use antenna 606 to establish a near-field communication (NFC) communication link with at least one other electronic device and upon establishing the NFC communication link, use receiver 608 to wirelessly receive data (e.g., audio files, data files, video files, etc.) from the at least one other electronic device and further use transmitter 604 to wireless transmit data to the at least one other electronic device.

In one embodiment, the communication device 600 may further comprise a mobile system modem (MSM) or modem processor 610 coupled to the transmitter 604, the receiver 608, and the NFC module 620, wherein the NFC module 620 may be further coupled to the transmitter 604 and the receiver 608. Furthermore, the MSM 610 and the NFC module 620 may both be coupled to a power management module (PMM) 640 configured to process and generate one or more control signals to transition the NFC module 620 from one state to another. In one embodiment, the communication device 600 may further comprise a machine-readable medium 630 operatively coupled to the NFC module 620 and that can store information related to data processing. The machine-readable medium 630 may be located outside and/or inside the NFC module 620 and/or the MSM 610. Further, the machine-readable medium 630 may be one medium or a plurality of media. For example, the machine-readable medium 630 may include storage integrated into the MSM 610 and/or the NFC module 620, such as might be the case with an ASIC, and/or storage external to the MSM 610 and/or the NFC module 620. By way of illustration, and not limitation, the machine-readable medium 630 may include one or more of volatile memory, non-volatile memory, random access memory (RAM), flash memory, read only memory (ROM), programmable ROM (PROM), Erasable PROM (EPROM), a register, a hard disk, a removable disk, a CD-ROM, a DVD, or any other suitable storage device. In addition, the machine-readable medium 630 may include a transmission line or a carrier wave that encodes a data signal or a computer-readable medium that stores or is encoded with a computer program or instructions, which may be executable by the transmitter 604, the receiver 608, the MSM 610, and/or the NFC module 620.

In one embodiment, to transition the NFC module 620 from one state to another, the MSM 610 may supply a DISABLE_pad signal 615 to the PMM 640, which may include a mode selection circuit 645 that determines whether the DISABLE_pad signal 615 satisfies one or more criteria that warrant transitioning the NFC module 620 from one state to another. For example, in one embodiment, the mode selection circuit 645 may generally operate as described in further detail above with respect to FIGS. 3-5 to determine whether the DISABLE_pad signal 615 falls within a window associated with a DISABLE mode, a SCAN mode, a TEST mode, or other suitable modes. As such, the mode selection circuit 645 may generate a target mode signal 650 to indicate a target mode associated with the NFC module 620, wherein the target mode signal 650 may be based on the DISABLE_pad signal 615. In one embodiment, if the target mode signal 650 indicates that the DISABLE_pad signal 615 falls within a voltage window associated with the DISABLE mode, the target mode signal 650 may cause a mode selector 626 on the NFC module 620 to disable all modules therein. Alternatively, if the target mode signal 650 indicates that the DISABLE_pad signal 615 falls within a voltage window associated with the SCAN mode or the TEST mode, the mode selector 626 may appropriately activate either the SCAN module 622 or the TEST module 624, wherein the NFC module 620 may then use the activated module for subsequent NFC communications. Of course, those skilled in the pertinent art will appreciate that the NFC module 620 may operate in various other modes, which may be supported with one or more other modules 628 that the mode selector 626 may activate for use in subsequent NFC communications based on the target mode signal 650.

Those skilled in the pertinent art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any suitable combination thereof.

Further, those skilled in the pertinent art will appreciate that the various illustrative logical blocks, modules, circuits, algorithms, and steps described in connection with the embodiments disclosed herein may be implemented as electronic hardware, computer software, or any suitable combinations thereof. To clearly illustrate this interchangeability of hardware and software, various illustrative components, blocks, modules, circuits, algorithms, and steps have been described above in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure.

The various illustrative logical blocks, modules, and circuits described in connection with the embodiments disclosed herein may be controlled with a general purpose processor, a digital signal processor (DSP), an application specific integrated circuit (ASIC), a field programmable gate array, or other programmable logic devices, discrete gates, transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The control steps of a method or algorithm described in connection with the embodiments disclosed herein may be embodied directly in hardware, in a software module executed by a processor, or in a combination thereof. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative embodiments of the multiple hardware interrupt functionality disclosed herein, those skilled in the pertinent art will appreciate that various changes and modifications could be made herein without departing from the scope or spirit of the disclosure, as defined by the appended claims. The functions, steps, operations, and/or actions of the method claims in accordance with the embodiments disclosed herein need not be performed in any particular order. Furthermore, although elements of the aspects and embodiments disclosed herein may be described or claimed in the singular, the plural is contemplated unless limitation to the singular is explicitly stated.

What is claimed is:

1. A hardware interrupt method, comprising:
   detecting voltage on a disable pin;
   determining that the voltage detected on the disable pin falls within one of a plurality of operational windows; and
   configuring a communication module to operate in one of a plurality of modes that is associated with the one of the plurality of operational windows, wherein the plurality of modes comprise a disabled mode associated with a first one of the plurality of operational windows, a scan mode associated with a second one of the plurality of operational windows, and a test mode associated with a third one of the plurality of operational windows.

2. The method of claim 1, further comprising:
   generating a plurality of reference voltages with a resistive divider; and
   comparing the voltage detected on the disable pin to the plurality of reference voltages generated with the resistive divider to determine whether the voltage on the disable pin falls within one of the plurality of operational windows.

3. The method of claim 2, wherein the resistive divider is operatively coupled to an input/output (I/O) rail.

4. The method of claim 3, further comprising:
   enabling circuitry to compare the voltage on the disable pin to the plurality of reference voltages in response to determining that a supply voltage associated with the I/O rail exceeds a predetermined threshold.

5. The method of claim 2, wherein the plurality of reference voltages define the plurality of operational windows within an input/output (I/O) voltage domain.

6. The method of claim 1, wherein configuring the communication module to operate in one of the plurality of modes further comprises:
   entering the disabled mode if the voltage on the disable pin falls within the first one of the plurality of operational windows.

7. The method of claim 1, wherein configuring the communication module to operate in one of the plurality of modes further comprises:
   entering the scan mode if the voltage on the disable pin falls within the second one of the plurality of operational windows longer than a predetermined delay; and
   entering the test mode if the voltage on the disable pin falls within the third one of the plurality of operational windows longer than the predetermined delay.

8. An apparatus, comprising:
   means for detecting voltage on a disable pin;
   means for determining that the voltage detected on the disable pin falls within one of a plurality of operational windows; and
   means for configuring a communication module to operate in one of a plurality of modes that is associated with the one of the plurality of operational windows, wherein the plurality of modes comprise a disabled mode associated with a first one of the plurality of operational windows, a scan mode associated with a second one of the plurality of operational windows, and a test mode associated with a third one of the plurality of operational windows.

9. The apparatus of claim 8, further comprising:
   means for generating a plurality of reference voltages; and
   means for comparing the voltage detected on the disable pin to the plurality of reference voltages to determine whether the voltage on the disable pin falls within one of the plurality of operational windows.

10. The apparatus of claim 9, wherein the means for generating the plurality of reference voltages is operatively coupled to an input/output (I/O) rail.

11. The apparatus of claim 10, further comprising:
    means for enabling circuitry to compare the voltage on the disable pin to the plurality of reference voltages in response to determining that a supply voltage associated with the I/O rail exceeds a predetermined threshold.

12. The apparatus of claim 9, wherein the plurality of reference voltages define the plurality of operational windows within an input/output (I/O) voltage domain.

13. The apparatus of claim 8, wherein the means for configuring the communication module to operate in one of the plurality of modes further comprises:
    means for entering the disabled mode if the voltage on the disable pin falls within the first one of the plurality of operational windows.

14. The apparatus of claim 8, wherein the means for configuring the communication module to operate in one of the plurality of modes further comprises:
    means for entering the scan mode if the voltage on the disable pin falls within the second one of the plurality of operational windows longer than a predetermined delay; and
    means for entering the test mode if the voltage on the disable pin falls within the third one of the plurality of operational windows longer than the predetermined delay.

15. An apparatus, comprising:
    at least one processor configured to detect voltage on a disable pin, determine that the voltage detected on the disable pin falls within one of a plurality of operational windows, and configure a communication module to operate in one of a plurality of modes that is associated with the one of the plurality of operational windows, wherein the plurality of modes comprise a disabled mode associated with a first one of the plurality of operational windows, a scan mode associated with a second one of the plurality of operational windows, and a test mode associated with a third one of the plurality of operational windows; and a memory coupled to the at least one processor.

16. A non-transitory computer-readable storage medium having computer-executable instructions recorded thereon, wherein executing the computer-executable instructions on one or more processors causes the one or more processors to:

detect voltage on a disable pin;

determine that the voltage detected on the disable pin falls within one of a plurality of operational windows; and configure a communication module to operate in one of a plurality of modes that is associated with the one of the plurality of operational windows, wherein the plurality of modes comprise a disabled mode associated with a first one of the plurality of operational windows, a scan mode associated with a second one of the plurality of operational windows, and a test mode associated with a third one of the plurality of operational windows.

17. A circuit comprising:

a disable pin;

a resistive divider configured to generate a plurality of reference voltages; and a comparator stage configured to compare voltage on the disable pin to the plurality of reference voltages and generate a control signal to indicate a target mode associated with a communication module if the voltage on the disable pin falls within one of a plurality of operational windows based on the plurality of reference voltages, wherein the plurality of modes comprise a disabled mode associated with a first one of the plurality of operational windows, a scan mode associated with a second one of the plurality of operational windows, and a test mode associated with a third one of the plurality of operational windows.

18. The circuit of claim 17, wherein the resistive divider is operatively coupled to an input/output (I/O) rail.

19. The circuit of claim 18, further comprising:

a monitor stage configured to generate a signal that enables the comparator stage if a supply voltage associated with the I/O rail exceeds a predetermined threshold.

20. The circuit of claim 17, wherein the plurality of reference voltages define the plurality of operational windows within an input/output (I/O) voltage domain.

21. The circuit of claim 17, wherein the comparator stage comprises:

a first comparator configured to indicate the disabled mode as the target mode associated with the communication module if the voltage on the disable pin falls within the first one of the plurality of operational windows;

a second comparator configured to indicate whether the voltage on the disable pin falls within the second one of the plurality of operational windows; and a third comparator configured to indicate whether the voltage on the disable pin falls within the third one of the plurality of operational windows.

22. The circuit of claim 21, wherein the comparator stage further comprises:

a first delay element configured to indicate the scan mode as the target mode associated with the communication module if the second comparator indicates that the voltage on the disable pin falls within the second one of the plurality of operational windows for longer than a predetermined delay; and a second delay element configured to indicate the test mode as the target mode associated with the communication module if the third comparator indicates that the voltage on the disable pin falls within the third one of the plurality of operational windows for longer than the predetermined delay.

23. The circuit of claim 21, further comprising:

a first inverter coupled to an output from the first comparator, wherein the first inverter generates a signal to enable the second comparator and to enable the third comparator if the output from the first comparator indicates that the voltage on the disable pin does not fall within the first one of the plurality of operational windows; and a second inverter coupled to an output from the second comparator, wherein the second inverter generates a signal to further enable the third comparator if the output from the second comparator indicates that the voltage on the disable pin does not fall within the second one of the plurality of operational windows.

* * * * *